(12) United States Patent
Truax

(10) Patent No.: US 11,841,548 B2
(45) Date of Patent: Dec. 12, 2023

(54) VARIABLE-ZOOM IMAGING APPARATUS

(71) Applicant: Zygo Corporation, Middlefield, CT (US)

(72) Inventor: Bruce E. Truax, Southington, CT (US)

(73) Assignee: Zygo Corporation, Middlefield, CT (US)

( * ) Notice: Subject to any disclaimer, the term of this patent is extended or adjusted under 35 U.S.C. 154(b) by 31 days.

(21) Appl. No.: 17/361,760

(22) Filed: Jun. 29, 2021

(65) Prior Publication Data

US 2022/0057599 A1 Feb. 24, 2022

Related U.S. Application Data

(60) Provisional application No. 63/066,935, filed on Aug. 18, 2020.

(51) Int. Cl.
*G02B 7/28* (2021.01)
*G02B 15/14* (2006.01)
*H04N 23/80* (2023.01)

(52) U.S. Cl.
CPC ............. *G02B 7/282* (2013.01); *G02B 15/14* (2013.01); *H04N 23/80* (2023.01)

(58) Field of Classification Search
CPC ........ G02B 7/282; G02B 15/14; H04N 23/80; H04N 23/69
See application file for complete search history.

(56) References Cited

U.S. PATENT DOCUMENTS 5,875,059 A * 2/1999 Estelle ............... G02B 15/1425
359/740
6,843,107 B2 * 1/2005 Newman ............... G01M 3/363
73/49.3

(Continued)

FOREIGN PATENT DOCUMENTS

CN 105393156 3/2016
CN 106338809 1/2017

(Continued)

OTHER PUBLICATIONS

The International Search Report and Written Opinion of the International Searching Authority for International Application No. PCT/US2021/039698, dated Dec. 13, 2021.

(Continued)

*Primary Examiner* — Luong T Nguyen
(74) *Attorney, Agent, or Firm* — Fish & Richardson P.C.

(57) ABSTRACT

Disclosed is a variable-zoom imaging apparatus that includes: i) imaging optics configured to form an image in an imaging area of an object positioned in an object area; ii) an adjustable aperture stop to adjustably set a numerical aperture NA for the image formed by the imaging optics; iii) an electronic detector comprising an array of detector elements positioned in the imaging area to detect the image; and iv) image processing circuitry coupled to the electronic detector to produce a digital representation of the image based on signals from at least some of the detector elements. The image processing circuitry produces the digital representation with a different magnification of the object m for each of a plurality of different numerical apertures for the image set by the adjustable aperture stop.

43 Claims, 18 Drawing Sheets
(14 of 18 Drawing Sheet(s) Filed in Color)

(56) References Cited

U.S. PATENT DOCUMENTS

| | | | |
|---|---|---|---|
| 8,922,907 | B2 | 12/2014 | Ohtake et al. |
| 9,268,119 | B2 | 2/2016 | Sugita |
| 10,267,617 | B2 | 4/2019 | Deck |
| 10,484,615 | B2 | 11/2019 | Duckett, III |
| 2001/0048474 | A1 | 12/2001 | Yamazaki et al. |
| 2003/0026110 | A1* | 2/2003 | Satoh ............... A61B 5/442 348/E5.029 |
| 2003/0081137 | A1 | 5/2003 | Yamazaki |
| 2006/0280482 | A1* | 12/2006 | Uchiyama ......... H04N 23/73 348/E5.037 |
| 2007/0296837 | A1 | 12/2007 | Morita |
| 2011/0205635 | A1 | 8/2011 | Tang et al. |
| 2015/0022796 | A1* | 1/2015 | Yamaguchi ........ G01B 9/0209 356/451 |
| 2016/0077316 | A1 | 3/2016 | Yamamoto et al. |
| 2017/0013185 | A1 | 1/2017 | Gladnick |
| 2019/0258042 | A1* | 8/2019 | Kleppe ............... G02B 6/08 |

FOREIGN PATENT DOCUMENTS

| | | |
|---|---|---|
| IL | 171853 | 12/2010 |
| JP | 3797543 | 7/2006 |
| TW | 201129821 | 9/2011 |

OTHER PUBLICATIONS

"Numerical aperture", Wikipedia, last edited on Dec. 19, 2021.
The Office Action and Search Report issued by the Taiwan Patent Office for Application No. TW 110129767, dated Jul. 4, 2022 (with English Translation).
Kingslake, R., "Types of Zoom Lenses", *Optical System Design*, Academic Press, NY, pp. 277-279 (1983).
Smythe, R., et al., "Interferometric Measurement of Mid-Spatial Frequency Wavefront Errors", *Optical Design and Fabrication Congress 2017*, (2017).
The International Preliminary Report on Patentability for International Application No. PCT/US2021/039698, dated Mar. 2, 2023.

* cited by examiner

VARIABLE-ZOOM IMAGING APPARATUS

CROSS-REFERENCE TO RELATED APPLICATIONS

This application claims priority under 35 U.S.C. § 119 to U.S. Provisional Application No. 63/066,935 filed Aug. 18, 2021, the entire contents of which are incorporated herein by reference.

FIELD

This disclosure relates to a variable-zoom imaging apparatus. More specifically, this disclosure relates to an optical imaging system for use with a high-resolution optical sensor that enables a high-quality, variable zoom in a cost-efficient manner.

BACKGROUND

An optical imaging system forms an image in an image area (typically on an image plane) of an object positioned in an object area. The optical imaging system includes one or more optical imaging elements, such as lenses or curved mirrors. Within the framework of geometrical optics, the properties of each optical imaging element and their positionings relative to each other and each of the object and image areas collectively cause light rays emerging from each point of the object area to recombine at a corresponding point in the image area to thereby form the image. Accordingly, the optical imaging system generates a spatial distribution of light in the image area that corresponds to the spatial features of the object in the object area. Specifically, the image corresponds to how the spatial features of the object differently affect (e.g., reflect, transmit, diffract, scatter, and/or attenuate) incident light. In some cases, ambient light illuminates the object to generate the light rays captured by the optical imaging system to form the image, whereas in other cases, an illumination source is specifically used to generate this illumination light and generate the image. The spatial extent of the points in the object area that are imaged onto the image area is called the object field, and similarly, the spatial extent of the points in the image is called the image field.

Generally, the degree to which the optical imaging system can reproduce a small feature in the image field depends on the image-side numerical aperture NA of the optical imaging system, which corresponds to the range of angles at the imaging area for the light rays recombined by the optical imaging system at each point in the image area. For example, the image-side numerical aperture NA can be expressed as $n \cdot \sin \theta$, where $\theta$ is the angle formed between the most oblique ray incident on the image area (i.e., the marginal ray) and the optical axis and where n is the index of refraction for the medium immediately prior to the image area. The aperture stop for the optical imaging system is the element in the system that sets this numerical aperture NA by preventing any light ray that would be outside this range of angles from reaching the image area.

The magnification m' of an optical imaging system with respect to the image in the image area is a measure of the degree to which the lateral dimensions of respective features in the image in the image area are increased (or decreased) relative to those in the object. Accordingly, a feature of the object with lateral dimension D will be reproduced in the image with a lateral dimension equal to m'·D. Often, it is desirable to provide the optical imaging system with range of different magnifications that can be selected by a user. For example, after viewing the object over a large object field at a lower magnification a user may desire to view a subset of this object field at a greater magnification $m'_2$, i.e., the user may want to "zoom" into a subset of the object area. An imaging system that provides different magnifications m that vary from a minimum magnification of $m=m_{min}$ to a maximum magnification of defines a zoom ratio $z=m'/m'_{min}$ and a maximum zoom ratio $z_{max}=m'_{max}/m'_{min}$. Optical imaging systems with $z_{max}>1$ can be referred to as variable-zoom systems.

Conventionally, variable-zoom optical systems include systems having one or more optical imaging elements that move relative to one other to provide the variable magnification and systems with turrets to insert one of several different optical modules into the light path to provide the variable magnification. Optically, this variable magnification is achieved by fixing the image-side numerical aperture while decreasing the object field and increasing the object-side numerical aperture.

To capture and store a digital representation of the image of the object produced by an optical imaging system, an optical sensor (also referred to herein as a "detector" or "camera") having an array of detector elements can be positioned on the image area. Each detector element produces an electrical signal corresponding to a measure of light intensity incident on the detector element (or in some instances, a measure of a light intensity incident on the detector element for each of multiple colors of the light). Image processing circuitry is coupled to the array of detector elements to process the electrical signals and store a digital representation of the image. Current technological advances have enabled high-resolution optical sensors that provide a very large lateral density of distinct detector elements. Indeed, the number of detector elements can be much greater than the typical number of pixels necessary for the digital representation. As a result, some prior art imaging systems implement a "digital zoom," whereby different magnifications m of the object in the final digital representation are obtained simply by generating the digital representation from a corresponding subset of the entire set of detector elements. Specifically, the smallest zoom corresponds to sampling detector elements throughout the entire array of detector elements in the image field of the optical system, whereas larger zooms correspond to sampling detector elements that only lie within consecutively smaller subsets of the image area of the optical system.

SUMMARY

The inventor has recognized certain problems in prior art zoom systems. Systems that implement an optical zoom require moving parts, thereby decreasing robustness and increasing the likelihood of vibrations, image wander, or focus shift during zoom that can degrade performance. They also typically require a greater number of elements and/or more complex elements, thereby increasing the cost of manufacture and design. On the other hand, systems that implement digital zoom suffer from a mismatch between the design of the optical imaging system and detector element sampling over the entire zoom range.

For example, assume that the detector has an array of 10,000-by-10,000 detector elements and the desired resolution for the digital representation of the image is 1000-by-1000, then the zoom range can in principle go from 1 to 10 using digital zoom. Specifically, at the lowest zoom each pixel of the digital representation maps onto a corresponding 10-by-10 sub-array of detector elements, whereas at the highest zoom each pixel of the digital representation maps onto a single corresponding detector element in 1000-by-1000 sub-array within the entire array of detector elements. However, this difference in detector array sampling for different zooms imposes different constraints on the optical imaging system because the resolution of the 1000-by-1000 digital representation can be no better than the resolution of the optical image produced on the detector array by the optical imaging system. So, if the lateral dimension of a detector element is p, then at lowest zoom the optical imaging system only needs to provide a resolution sufficient to generate the optical image with feature sizes as small about 10p, but at the highest zoom the optical imaging system needs to provide a resolution sufficient to generate feature sizes as small as about p.

Thus, to provide a high-quality digital representation of the imaging over a full zoom-range using digital zoom only, the optical imaging system must provide resolution sufficient for the highest digital zoom setting. At the same time, the optical imaging system must capture the light ray bundles from the entire object field corresponding to the lowest zoom thereby increasing the complexity of the optical imaging system, such requiring many and/or larger optical imaging elements. This is because, generally, the complexity of the optical imaging system increases with increases in each of the object field and the image-side NA. For example, it is easier to design an optical system to produce an image of a relatively smaller area with coarse resolution than to design one to produce an image of a relatively larger area with fine resolution. To do the latter generally requires a greater number of optical elements, larger optical elements, and/or more complex optical elements to direct the correspondingly larger ray bundles from each of the larger number of points in the larger object field.

To solve these problems, the inventor discloses a system that combines digital zoom with a much simpler optical imaging system that includes a variable aperture stop to adjust the image-side numerical aperture NA in accordance with the resolution required by the digital zoom setting. At the lowest zoom, the aperture stop is set to the smallest NA and the optical imaging system is designed to capture the light ray bundles from the entire object field at this smallest NA to produce the optical image on the detector. At higher zooms, the aperture stop opening is set to a larger NA to provide the necessary resolution for a (smaller) sub-area of the object field corresponding to the higher zoom. The optical imaging system is designed to capture the light ray bundles from this sub-area of the object field at this larger NA to produce the optical image on the detector. On the other hand, to simplify the design of the optical imaging system, the optical imaging system is not designed to capture all of the light ray bundles from the object field outside of this sub-area at this larger NA. While this may produce a blurry image on certain portions of the detector, those portions will correspond to detector elements that are outside the sampling areas of the detector used to produce the digital representation of the optical image at these higher zooms. This greatly reduces the design constraints on the optical imaging system, thereby reducing costs and complexity, while still producing digital images of the object having the desired resolution over the entire zoom range.

Accordingly, and more generally, the following embodiments are disclosed.

In general, in one aspect, a variable-zoom imaging apparatus is disclosed. The variable-zoom imaging apparatus includes: i) imaging optics configured to form an image in an imaging area of an object positioned in an object area; ii) an adjustable aperture stop to adjustably set a numerical aperture NA for the image formed by the imaging optics; iii) an electronic detector comprising an array of detector elements positioned in the imaging area to detect the image; and iv) image processing circuitry coupled to the electronic detector to produce a digital representation of the image based on signals from at least some of the detector elements. The image processing circuitry produces the digital representation with a different magnification of the object m for each of a plurality of different numerical apertures for the image set by the adjustable aperture stop, wherein the different magnifications m vary from a minimum magnification of $m=m_{min}$ to a maximum magnification of $m=m_{max}$ to define a zoom ratio $z=m/m_{min}$ and a maximum zoom ratio $z_{max}=m_{max}/m_{min}$.

Embodiments of the variable-zoom imaging apparatus may include any of the following additional features.

The imaging optics may be fixed to provide a constant magnification of the object area to the image area.

The zoom ratio z for the digital representation may vary inversely with a field area spanned by the detector elements to produce the digital representation. For example, the sizes of the different numerical apertures may be set by the adjustable aperture stop to increase with corresponding increases in the zoom ratio z for the digital representation. Furthermore, in certain embodiments, the sizes of the different numerical apertures set by the adjustable aperture stop may increase linearly with corresponding increases in the zoom ratio z for the digital representation over a range of zoom ratios greater than 1. For example, the numerical aperture NA for the image set by the adjustable aperture stop may be given by $$NA \propto \frac{\lambda}{2p\left(\frac{z_{max}}{z}\right)},$$

where p is a maximum lateral dimension of a detector element and $\lambda$ is a central wavelength in light used to form the image on the detector.

The digital representation may include at least one intensity value at each pixel in an $N_1$ by $N_2$ array of pixels, where $N_1$ and $N_2$ are positive integers. For example, $N_1$ and $N_2$ may each be greater than or equal to 400.

The array of detector elements for the electronic detector may include an array at least as large as an $M \cdot N_1$ by $M \cdot N_2$ array, where M is a positive integer greater than or equal to $z_{max}$. For example, $z_{max}$ may be greater than or equal to 3. In certain embodiments, the image processing circuitry produces the digital representation with a zoom ratio z by determining the intensity value for each pixel in the $N_1$ by $N_2$ array from one or more of the signals from the detector elements in a corresponding sub-array of M/z by M/z of detector elements. In other certain embodiments, the image processing circuitry produces the digital representation with a zoom ratio z by determining the intensity value for each pixel in the $N_1$ by $N_2$ array from only one of the signals from the detector elements in the corresponding sub-array of M/z by M/z of detector elements. In yet further certain embodiments, the image processing circuitry produces the digital representation with a zoom ratio z by determining the intensity value for each pixel in the $N_1$ by $N_2$ array from a weighted average of the signals from the detector elements in the corresponding sub-array of M/z by M/z of detector elements. Also, in certain embodiments, the sub-arrays of detector elements corresponding to the pixels in the digital representation are repetitively spaced from one another within the field area spanned by the detector elements to produce the digital representation.

In general, in certain embodiments, the image processing circuitry produces the digital representation with a zoom ratio z by determining the intensity value for each pixel in the $N_1$ by $N_2$ array from one or more of the signals from the detector elements in a corresponding sub-array of one or more detector elements, wherein the number of detector elements in each of the corresponding sub-arrays decreases with the increasing numerical aperture NA adjustably set by the aperture stop.

The imaging optics may include a first set of optics to direct light from the object to a pupil defined by the aperture stop and a second set of optics to direct light from the pupil to image area. The variable-zoom imaging apparatus may further include a light source configured to illuminate the object and thereby provide light to the imaging optics for forming the image of the object. For example, the light source may be a coherent laser. Also, in certain embodiments, the variable-zoom imaging apparatus may further include interferometer components including a beam splitter and a reference surface, wherein the light source is also configured to illuminate the reference surface and the beam splitter is configured to coherently combine light from the object and the reference surface so that the imaged formed by the imaging optics on the imaging area is an interferometric image.

In certain embodiments, the area of the array of detector elements is between 0.25 cm$^2$ and 10 cm$^2$.

In certain embodiments, the minimum magnification is between 1/10 and 1/5, such as where the variable-zoom imaging apparatus is a Fizeau interferometer. In other certain embodiments, the minimum magnification is between 1/2 and 5, such as where the variable-zoom imaging apparatus is a microscope interferometer.

In certain embodiments, the area of the object area imaged onto the array of detector elements is between 0.04 cm$^2$ and 10,000 cm$^2$.

The adjustable aperture stop may be continuously adjustable. Alternatively, the adjustable aperture stop may be discretely adjustable to each of a plurality of discrete settings. For example, the adjustable aperture stop may be a mechanical aperture stop or an electronic aperture stop. Also, for example, the aperture stop may provide a nominally circular opening to define the numerical aperture. Alternatively, for example, the aperture stop may provide a nominally rectangular opening to define the numerical aperture.

The variable-zoom imaging apparatus may further include a user-control interface configured to electronically adjust the adjustable aperture stop in response to a user-input for the zoom ratio. For example, the user-control interface may also cause the image control circuitry to set the magnification of the object by the detector in response to the user-input for the zoom ratio. Furthermore, for example, the image control circuitry may be configured to set the magnification of the object by the detector by adjusting the sampling of the detector elements used to produce the digital representation.

In certain embodiments, the imaging optics does not need to be sufficiently large in diameter to pass all light ray trajectories from the object for a full field area of the object corresponding a full field area spanning all of the detector elements in the array when the adjustable aperture stop is set to the largest one of the plurality of different numerical apertures. However, in such embodiments, the imaging optics may be sufficiently large in diameter to pass all light ray trajectories from the object for the full field area of the object when the adjustable aperture stop is set to the smallest one of the plurality of different numerical apertures.

In certain embodiments, the imaging optics does not produce a diffraction-limited image over a full field area spanning all of the detector elements in the array when the adjustable aperture stop is set to the largest one of the plurality of different numerical apertures. However, in such embodiments, the imaging optics may produce a diffraction-limited image over the full field area when the adjustable aperture stop is set to the smallest one of the plurality of different numerical apertures. Also, for example, the imaging optics may produce a diffraction-limited image over a maximum-zoomed field area equal to an area of the full field area divided by $z_{max}$ when the adjustable aperture stop is set to the largest one of the plurality of different numerical apertures. The imaging optics producing a diffraction-limited image for the numerical aperture NA over a given field of view in the image area ("FOV") means that the imaging optics can produce a feature in the image area with a spatial period d as small as $d=\lambda/NA$ anywhere in the FOV for coherent illumination.

In general, in another aspect, an optical imaging system for use with a variable-zoom imaging apparatus implementing a digital zoom is disclosed. The optical imaging system includes: i) imaging optics configured to form an image in an imaging area of an object positioned in an object area; and ii) an adjustable aperture stop to adjustably set a numerical aperture NA for the image formed by the imaging optics. The imaging optics are designed to form the image as a diffraction-limited image for each of a plurality of consecutive increasing numerical apertures NAs for the image set by the adjustable aperture stop corresponding to consecutively decreasing fields of view of the object in the object area.

Embodiments of the optical imaging systems may further include any of the features described above for the variable-zoom imaging apparatus.

All documents referred to herein, if any, are incorporated by reference in their entirety. In case of conflict with the present disclosure, and any document incorporated by reference, the present disclosure controls.

The details of one or more embodiments of the invention are set forth in the accompanying drawings and the description below. Other features, objects, and advantages of the invention will be apparent from the description and drawings, and from the claims.

DESCRIPTION OF DRAWINGS

The patent or application file contains at least one drawing executed in color. Copies of this patent or patent publication with color drawing(s) will be provided by the Office upon request and payment of the necessary fee.

FIG. 13 shows full object field imaging at 1100-pixel resolution, and

FIG. 14 shows one-third object field imaging at 1100-pixel resolution, with the pixel dimension one-third of that in FIG. 13.

Like reference symbols in the various drawings indicate like elements.

DETAILED DESCRIPTION

Image zoom is an important feature in many optical systems. Zooming-in on the image provides the user with better lateral resolution over a smaller image size. A well-designed zoom system will increase useable resolution in direct proportion to the zoom ratio. This is normally done by fixing the numerical aperture of the imaging ray bundle on the sensor while decreasing the lens field of view and increasing the object space numerical aperture. The advent of new, very high-resolution sensors provides an alternative method ("digital" zooming) for image zoom for a subset of applications where the required number of resolution elements across the image is significantly less than the number of sensor elements across the sensor. As discussed above, however, digital zooming generally suffers from a mismatch between the design of the optical imaging system and detector element sampling over the entire digital zoom range.

Embodiments of the present invention include an imaging system where the aperture stop increases in size proportionally with the desired zoom ratio and the field of view is adjusted by sampling a proportionally smaller area of the sensor. The optical system is designed such that the imaging remains diffraction limited over the field of view specified by the currently selected zoom ratio. Embodiments of this zoom-system can be much simpler than standard optical zooms which require complex cam mechanisms to move multiple optical elements to adjust zoom while maintaining focus. Furthermore, in at least some embodiments, they only require adjusting the size of an aperture stop while changing the displayed area of a sensor. Moreover, they can maintain focus and avoid the image wander observed in many mechanically-actuated, optical zoom-systems.

Figure 1A:
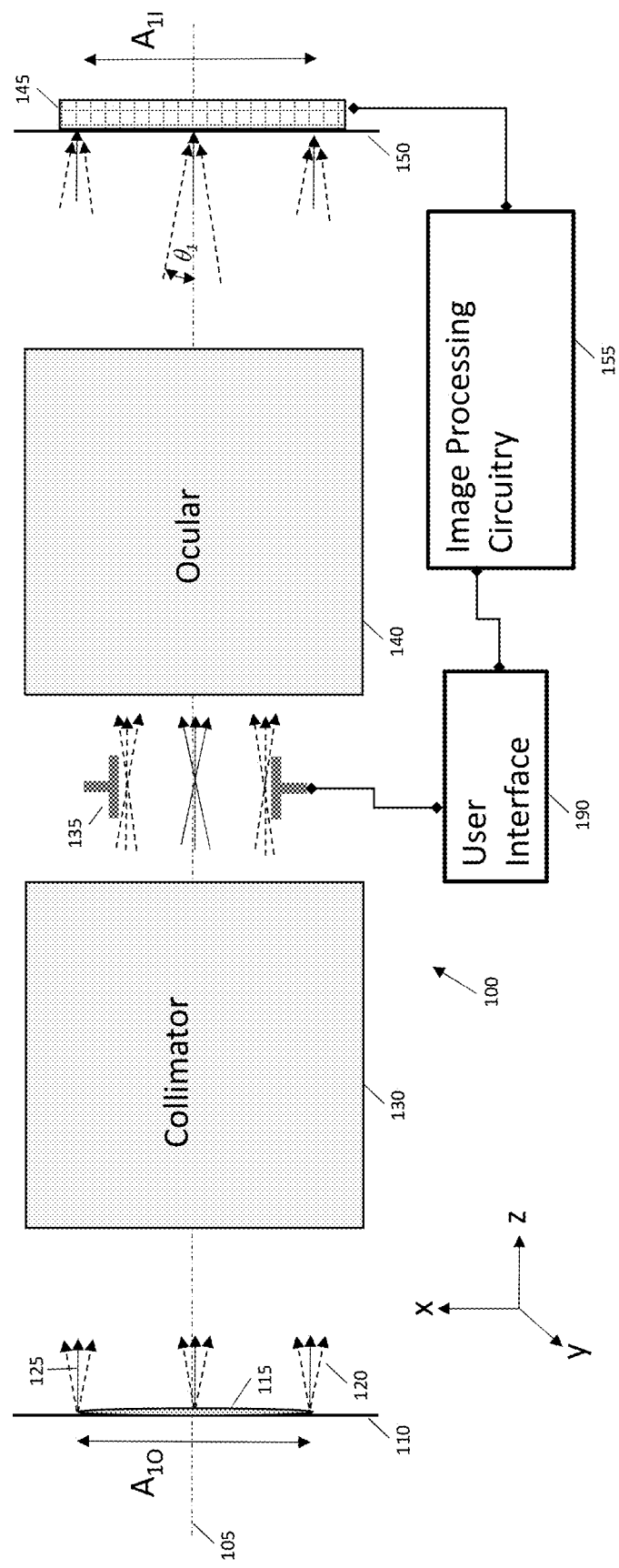
FIG. 1A is a schematic diagram of a variable-zoom imaging apparatus for a first lower magnification.
Figure 2A:
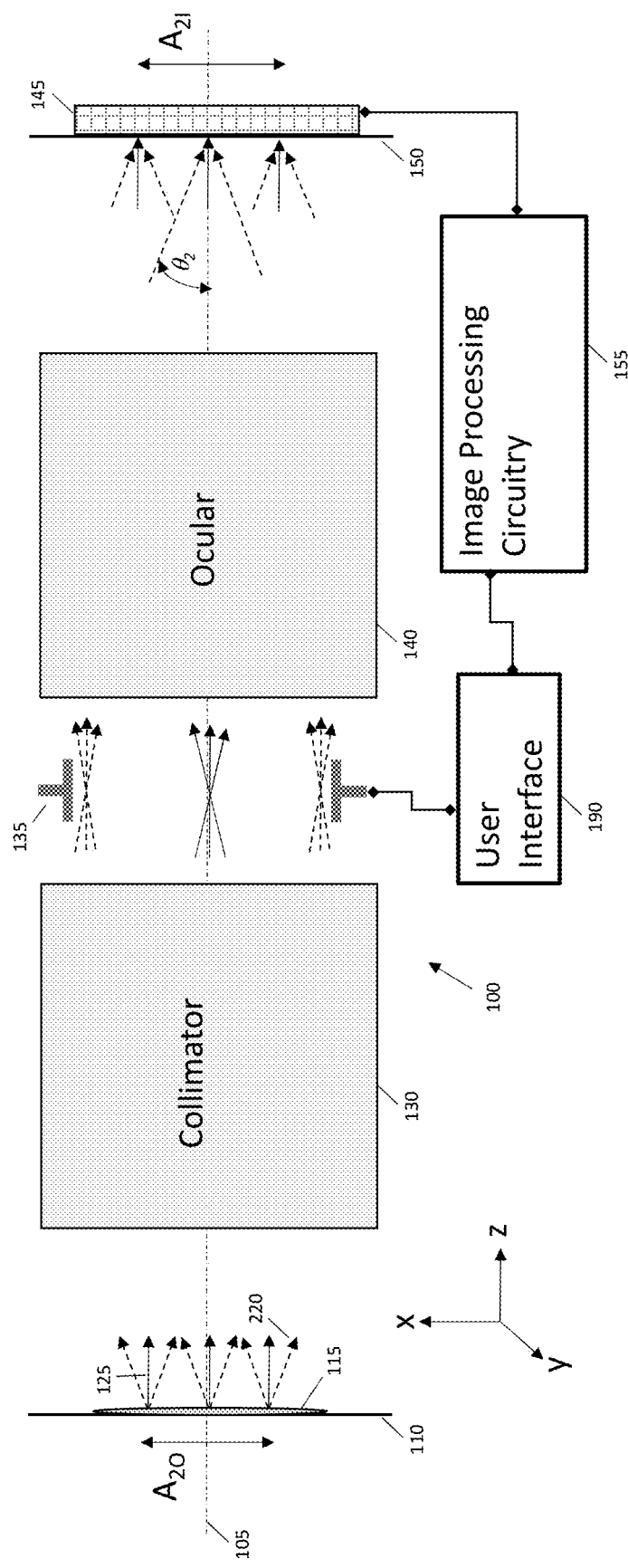
FIG. 2A is a schematic diagram of a variable-zoom imaging apparatus for a second, higher magnification.

A representative embodiment of the inventive variable-zoom imaging system 100 is shown in FIGS. 1A and 2A for a first, lower magnification $m_1$ (FIG. 1A) and a second, higher magnification $m_2$ (FIG. 2A). The variable-zoom imaging system 100 is configured to produce an image on an image area 150 of an object 115 on an object area 110. As will be described further below, the magnifications $m_1$ and $m_2$ are with respect to a final, digital representation of the image, and in contrast to the optical magnification m' of the image of the object in the image area, which is constant for inventive variable-zoom imaging system 100 shown in FIGS. 1A and 2A. In addition to its optical components, it includes an electronic detector 145 comprising an N-by-N array of detector elements (also referred to herein as a high-resolution sensor) configured to detect the image by measuring a light intensity value at each of the detector elements. Image processing circuitry 155 is electronically coupled to the detector 145 to store and process the intensity values to provide a digital representation of the image. The image processing circuitry 155 is electronically coupled to a user interface 190 to receive commands from the user interface and to provide the digital representation to the user interface 190. The optical components of the variable-zoom imaging system 100 extend along an optical axis 105 corresponding to the z-axis and include a first optical module of one or more optical elements 130 (also referred to herein as a "collimator"), a second optical module of one or more optical elements 140 (also referred to herein as an "ocular"), and an aperture stop 135 positioned between the first optical module 130 and the second optical module 140. The optical elements within optical modules 130 and 140 can include, for example, lenses and/or curved mirrors. In the present embodiment, both the object area 110 and the image area 150 extend parallel to the x-y plane, as do the array of detector elements for the detector 145. The aperture stop 135 provides a variable aperture opening to vary the image-side numerical aperture NA of the optical imaging system and is operatively coupled to the user interface 190 so that the user can control this image-side numerical aperture NA. The aperture opening will also limit the object-side numerical aperture, which equals the image-side numerical aperture NA multiplied by the magnification m.

The collimator 130 and ocular 140 form an optical imaging system for producing the optical image of the object 115 on the object area 110 on the image area 150. Specifically, the properties (e.g., dimensions and optical power) of each of the optical elements within the optical imaging system and their positionings relative to each other and each of the object and image areas collectively cause light rays emerging from each point of the object area to recombine at a corresponding point in the image area to thereby form the image. This is depicted schematically in each FIGS. 1A and 2A with respect to three points on the object area 110 and three corresponding points on the image area 150. There is one set of corresponding points on the optical axis 105 and the two other sets of corresponding points at the outer edges of the object and image fields (depicted by $A_{1O}$ and $A_{1I}$ in FIG. 1A and $A_{2O}$ and $A_{2I}$ in FIG. 2A). The central ray 125 of the ray bundle emerging from each point of the object area 110 is referred to as a chief ray and is depicted in FIGS. 1A and 2A as a solid arrow. The optical imaging system in FIGS. 1A and 2A is a telecentric system because the chief rays, which pass through the center of the opening providing by the aperture stop 135, are perpendicular to each of the object area 110 and image area 150. The outermost ray 120 (in FIG. 1A) and 220 (in FIG. 2A) of the ray bundle emerging from each point of the object area 110 is referred to as the marginal ray and is depicted in FIGS. 1A and 2A as a dashed arrow. The edge of the opening provided by aperture stop 135 coincides with the path of the marginal rays and delimits the angles at which the marginal rays emerge from the object area 110 and are incident on image area 150.

To configure the variable-zoom imaging system 100 for operation at the first, lower magnification $m_1$ (as shown in FIG. 1A), the user interface 190 causes the variable aperture stop 135 to provide a smaller opening for the ray bundles, thereby resulting in a smaller marginal ray 120 angle $\theta_1$ incident on the image area 150 relative to the optical axis 105 and a resulting smaller image-side numerical aperture $NA_1$. Conversely, to configure the variable-zoom imaging system 100 for operation at the second, higher magnification $m_2$ (as shown in FIG. 2A), the user interface 190 causes the variable aperture stop 135 to provide a larger opening for the ray bundles, thereby resulting in a larger marginal ray 220 angle $\theta_2$ incident on the image area 150 relative to the optical axis 105 and a resulting larger image-side numerical aperture $NA_2$. In certain embodiments, the ocular 140 has an effective focal length of f and the aperture stop 135 and image area 150 are positioned in the front and back focal planes of the ocular 140, respectively, in which case the marginal ray angle incident on the image area $\theta$ satisfies the equation $\tan\theta = r/f$, and $NA = n \cdot \sin[\arctan(r/f)]$, where r is the distance from the optical axis 105 to the edge of the aperture stop opening parallel to the x-y plane. For example, for a circular aperture stop positioned perpendicular to the optical axis, r is the radius of the aperture stop opening. In the limit of small angles for $\theta$, which are common in many imaging systems, the expression for NA simplifies to $NA = n \cdot r/f$.

Figure 1B:
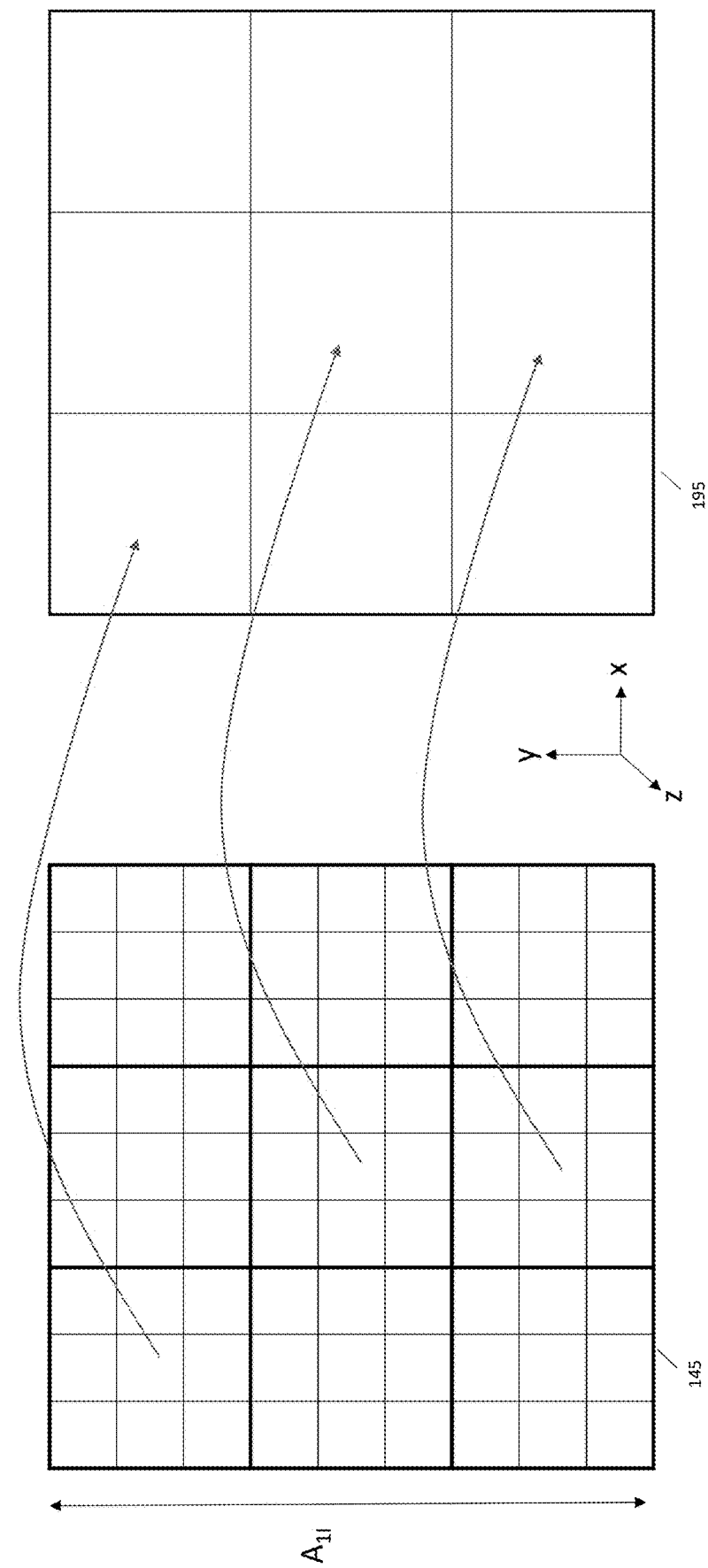
FIG. 1B is a schematic diagram of the digital sampling implemented by the variable-zoom imaging apparatus of FIG. 1A for the first, lower magnification.
Figure 2B:
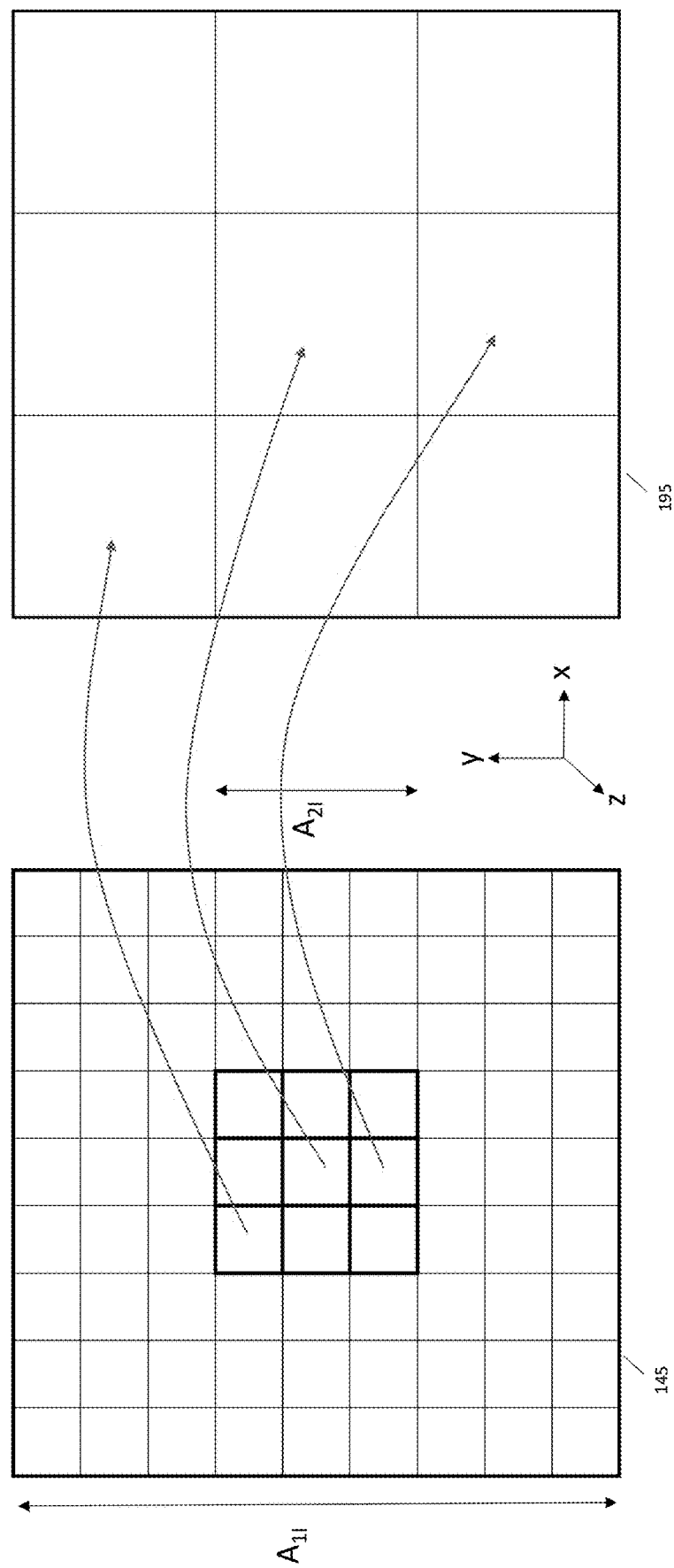
FIG. 2B is a schematic diagram of the digital sampling implemented by the variable-zoom imaging apparatus of FIG. 1A for the second, higher magnification.

Importantly, while the different magnifications $m_1$ and $m_2$ of the variable-zoom imaging system 100 correspond to different aperture stop openings, the optical elements within each of the collimator 130 and ocular 140 remain the same and do not move relative to each other, or relative to the object and image areas, thereby providing a very stable and robust system. Instead, digital zooming is used to provide the different magnifications, as schematically illustrated in FIGS. 1B and 2B, respectively. Specifically, FIGS. 1A and 1B schematically illustrate the sampling by imaging processing circuitry 155 of the detector elements of detector 150 to produce the digital representation 195. For ease of illustration, the digital representation 195 in these figures is depicted as having values across a 3-by-3 array of pixels, and the detector is depicted as having a 9-by-9 array of detector elements.

As shown in FIG. 1B, at the first, lower magnification $m_1$, an intensity value at each pixel in digital representation 195 is derived from one or more values in a spatially corresponding block of 3-by-3 detector elements in detector 145. For example, the intensity value could simply correspond to that for the central detector element in the 3-by-3 block of detector elements; it could correspond to the average of the intensity values in the 3-by-3 block of detector elements; it could correspond to a weighted average of the intensity values in the 3-by-3 block of detector elements (e.g., where the central detector element is weighted more heavily than the surrounding detector elements); or it could correspond to even more complex functions of the intensity values in the 3-by-3 block of detector elements. In any case, the digital representation is derived from detector elements that span the full area of the detector on the image area 150, corresponding to an image field dimension of $A_{1I}$, and therefore the scale of the digital representation corresponds to the object field dimension of $A_{1O}$.

On the other hand, as shown in FIG. 2B, at the second, higher magnification $m_2$, an intensity value at each pixel in the 3-by-3 digital representation 195 is derived from the intensity value for a corresponding detector element in a 3-by-3 block of detector elements in the center of the detector 145. In this case, the digital representation is derived from detector elements in only a central third of the full area of the detector on the image area 150, corresponding to an image field dimension of $A_{2I}$, and therefore the scale of the digital representation corresponds to the object field dimension of $A_{2O}$, which based on illustrative depiction in FIGS. 1B and 2B is one third of $A_{1O}$. As a result, for this illustrative depiction, the second, higher magnification $m_2$ is three times greater than the first, lower magnification $m_1$.

Of course, in practical embodiments, the resolution of the detector provides many, many more detector elements, e.g., at least 1000-by-1000, or even as large or larger than 10,000-by-10,000. As a result, in further embodiments, many more gradations of digital zoom are possible, where successively greater magnifications for the digital representation are based on sampling a consecutively smaller areas of the array of detector elements provided by the detector. To optically accommodate this increasing digital magnification, the variable aperture stop is set to correspondingly increase the aperture stop, and thereby the NA, so that the area of the optical image on the detector that is captured by the digital representation (i.e., the image field having dimension $A_i$) is diffraction-limited with respect to image features having sizes on the order of the block of detector elements corresponding to each pixel in the digital representation. On the other hand, the quality of the optical image on the detector outside of this area need not be of high-quality because the digital representation does not sample those areas, thereby lessening the design constraints on the optical imaging system.

For example, assume that the required image resolution for the digital representation is N-by-N pixels and the desired range for the zoom ratio z is from $z_{min}=1$ to $z_{max}M$, where M is a positive integer. Then in further embodiments, the detector is selected to have a resolution provided by at least an MN-by-MN array of detector elements. For example, in one embodiment for a zoom ratio of 1, the entire detector array is read and then sub-sampled such that every $M^{th}$ pixel on every $M^{th}$ row is selected to derive the values for each pixel in the N-by-N digital representation of the optical image. Through communication with the user interface, the image processing circuitry can alter this sampling to provide higher zoom ratios. For example, instead of sampling every $M^{th}$ pixel on every $M^{th}$ row to provide a zoom ratio equal to 1, the image processing circuitry can sample every $(M-m)^{th}$ pixel on every $(M-m)^{th}$ row, where m goes from 0 to M-1, to provide a zoom ratio z equal to $M/(M-m)$, and the imaging processing circuitry only reads a central portion of the detector array sufficient to populate the N-by-N digital representation at this sampling. Using these integer sampling intervals, it is possible to sample unique detector elements. For example, if M=3, then the integer values of m=0, 1, 2 would correspond to sampling 3×3, 2×2, and 1×1 pixel blocks, respectively, which correspond to zoom ratios z of 1, 1.5, and 3, respectively, However, intermediate zoom ratios can also be selected by interpolating detector elements. Moreover, as described above with respect to FIGS. 1B and 2B, the imaging processing circuitry can also derive the intensity value at each pixel in the digital representation from one or more intensity signals in spatially corresponding (M−m)-by-(M−m) blocks of detector elements, by averaging, weighted averaging, or more complex processing of these detector element signals.

To provide an optical image that exploits the resolution provided by the detector element sampling and that enables a diffraction-limited image to be captured by the digital representation at each such zoom ratio, the image-side numerical aperture NA set by the variable aperture stop (e.g., under control by the user interface) can be given by the formula:

$$NA = \frac{\lambda}{2p(M-m)} \quad (1)$$

where p is a minimum lateral dimension of a detector element and $\lambda$ is a central wavelength in light used to form the image on the detector. More generally, including for non-integral sampling, the NA can be set according to:

$$NA = \frac{\lambda}{2p\left(\frac{z_{max}}{z}\right)}. \quad (2)$$

As a result, the optical imaging system need only be designed to be diffraction limited at larger NAs, for consecutively smaller image fields $A_1$ corresponding to increasing digital zooms. Image quality on the detector that is not diffraction-limited that is outside the image field for a certain zoom ratio will not matter because those areas are not required to produce the digital representation for that zoom ratio. This is a significant advantage to the optical designer of the imaging optical system because the field size over which the optical imaging system needs to be corrected decreases inversely proportional to the size of the aperture stop opening. For example, at a zoom of 2×, the stop is twice as large as at 1×, but the field is ½ as large. This tradeoff of aperture stop size vs. field size makes it easier to design the optical system than if it were necessary to design a primary optical imaging system which was capable of the full field size and full resolution as would normally be required for a conventional digital zoom system that purports to be diffraction-limited. And, the advantage of this approach versus an optical continuous zoom or a series of zoom relay lenses on a turret is that there are no moving optical elements other than an aperture stop. This avoids the tight assembly and alignment tolerances required to minimize image position shift and focus shift during zoom.

The user experience is also noticeably improved. For example, because there are no moving lenses, the image position on the camera is, by definition, fixed between different zoom positions. Also, focus does not shift with zoom, so the user can zoom to the maximum magnification and focus the image and be confident that when switching to a lower zoom that focus will not shift. Furthermore, the raw pixel lateral calibration between the object and camera is unchanged with zoom ratios, and therefore a single calibration at any zoom position is enough to calibrate all zoom positions. Moreover, the subsampling of detector element array at lower zooms can result in a higher instrument transfer function ("ITF") because the individual detector element size is small compared the distance between detector elements being sampled.

In further embodiments, the relationship between the image-side numerical aperture NA and the zoom ratio z can differ somewhat from that shown in Equations (1) or (2) above. For example, Equations (1) and (2) assume coherent illumination of the object. To take into account incoherent illumination, one can consider the general formula for the Abbe resolution limit:

$$d=\lambda/(NA+NA') \quad (3)$$

where d is the smallest spatial period resolvable in the image and NA' is the numerical aperture for the illumination of the object. This illumination numerical aperture NA' varies from NA'=0 for coherent illumination to NA'=NA for incoherent illumination that fills the image-side aperture. Equations (1) and (2) correspond to this Abbe formula for coherent illumination resolving the smallest spatial period corresponding to a given zoom setting z:

$$d = 2p\left(\frac{z_{max}}{z}\right). \quad (4)$$

For example, at maximum zoom, d=2p, corresponding to the size of two detector elements. Accordingly, in other embodiments involving incoherent illumination, the expressions for image-side NA in Equations (1) and (2) are reduced by up to one-half in the limit of incoherent illumination that fills the image-side aperture.

Furthermore, Equations (1) and (2), whether or not modified to account for incoherent illumination, do not account for any oversampling whereby the numerical aperture is somewhat larger than that necessary for resolving the smallest spatial period corresponding to a given digital zoom setting. Accordingly, in other embodiments, the image-side numerical aperture NA can be somewhat larger than that given by Equations (1) and (2), whether or not modified to account for incoherent illumination. What is important, however, is that the image-side numerical aperture NA generally increases with corresponding increases in the zoom ratio z.

Optical imaging systems that implement the features of the present invention can be designed using conventional optical design software well-known in the art, such as Code V Optical Design Software from Synopsys or similar software from Zemax LLC. The simplification in optical design resulting from the present invention will now illustrated in FIGS. 3-14, which include ray-trace diagrams produced from such optical design software and illustrate chief ray, and in some cases marginal ray, propagation for several object points for various designs of the imaging optical system.

The cost of fabricating an optical imaging system is generally determined by the number of optical elements, and their size and precision. Therefore cost is controlled by minimizing the number of elements, reducing their size and allowing for looser tolerances on the surfaces and on their alignment. Often the optical imaging system is designed as a telecentric imaging system. In a telecentric imaging system designed for magnification or demagnification there are typically two groups of lenses separated such that they have a common focal point between the groups. The aperture stop of the system is located at this point. By locating the stop at the place where the two foci are coincident the chief rays on both the object and image sides of the lens are parallel to the optical axes. In the embodiment of FIGS. 1A and 2A, these two groups corresponding to the collimator 130 and ocular 140.

Figure 3:
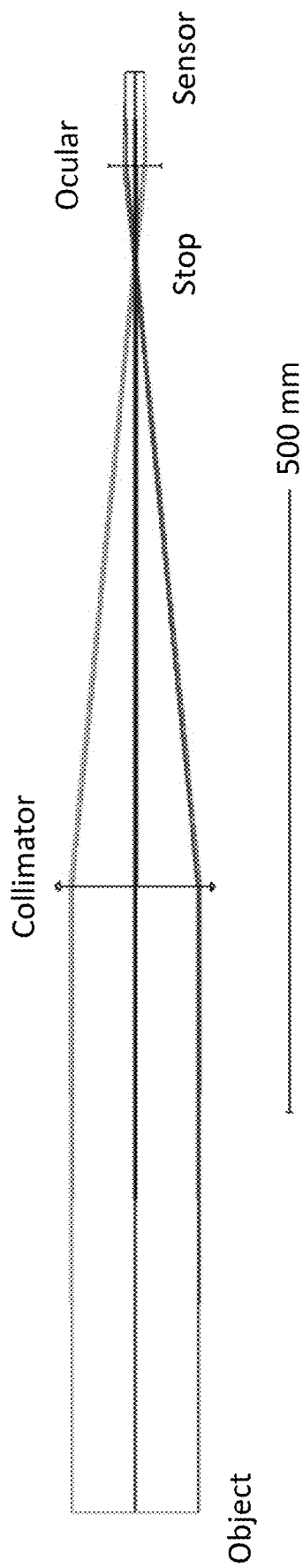
FIGS. 3-5 are ray trace diagrams of illustrative imaging optical systems for imaging an object onto a sensor, where the systems have a collimator, an aperture stop, and an ocular, and use the thin lens approximation for the collimator and ocular.
Figure 4:
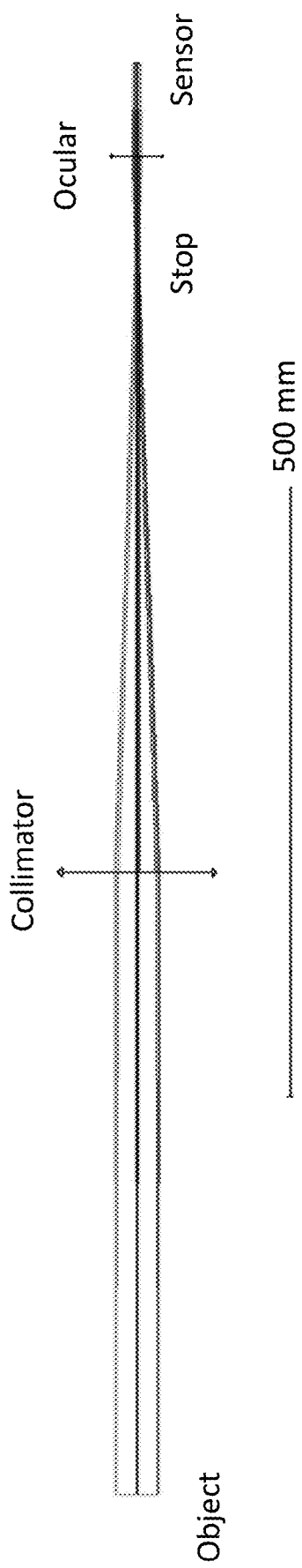
Figure 5:
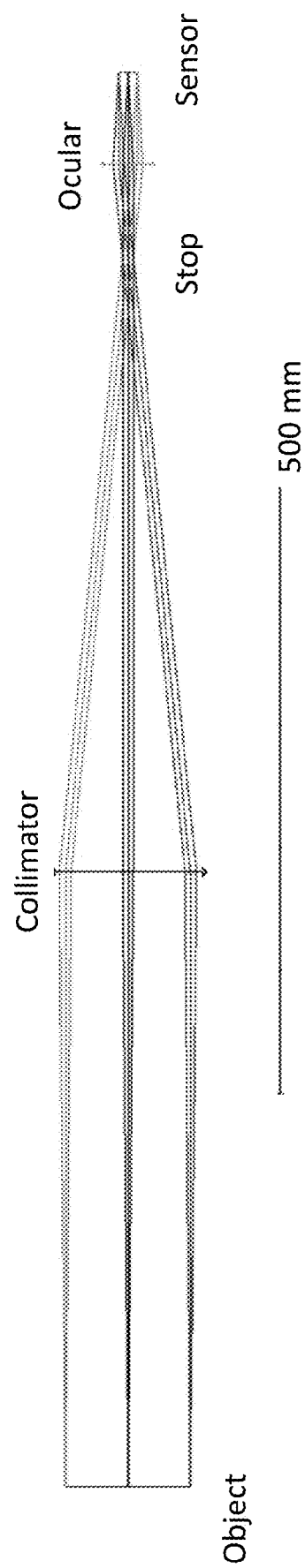

FIG. 3 illustrates a simple telecentric optical imaging system using the thin-lens approximation for producing an image of an object onto a sensor (i.e., a detector with an array of detector elements). The telecentric optical imaging system includes a collimator and an ocular sharing a common focal point, with the aperture positioned at that focal point. The sizes of the lenses are determined by a combination of the field of view (corresponding to object field $A_O$ in the embodiment of FIGS. 1A and 2A) and the aperture stop size. As illustrated in FIG. 4, a smaller field size will reduce the size of the required lenses. Furthermore, as illustrated in FIG. 5, increasing the aperture stop size will increase the required size of the lenses because the optical system needs to capture a larger angular range of rays emerging from each object point in the object field of view.

Figure 6:
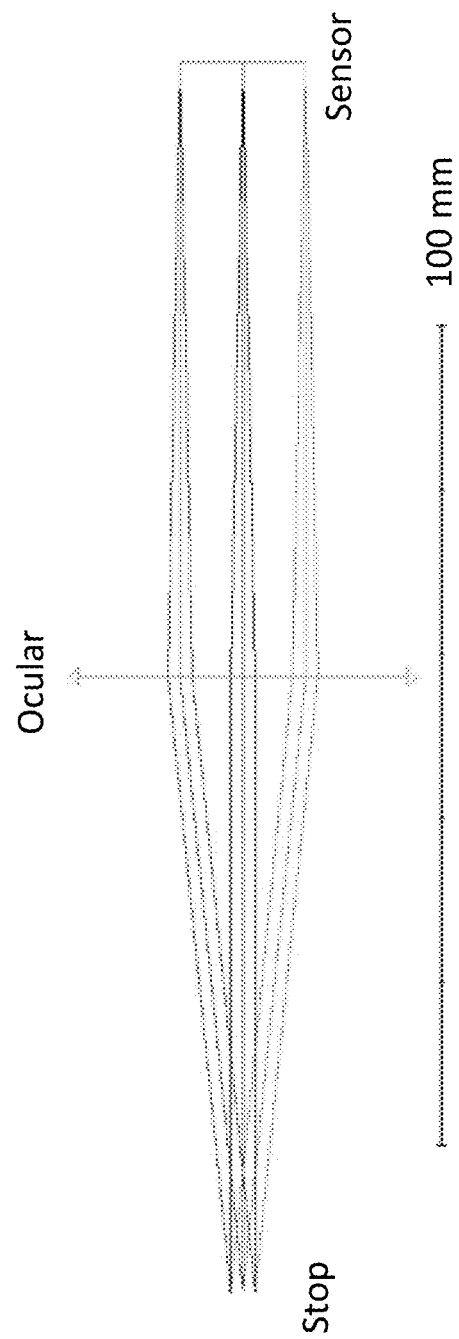
FIGS. 6-7 are ray trace diagrams for the ocular part of the systems depicted in FIGS. 3-5 to compare the ray bundles for a full object field and a smaller aperture stop (illustrated in FIG. 6) and a one-third object field size system (resulting in a 3× magnification for the digital representation rendered by the sensor) and a 3× larger aperture stop (illustrated in FIG. 7).
Figure 7:
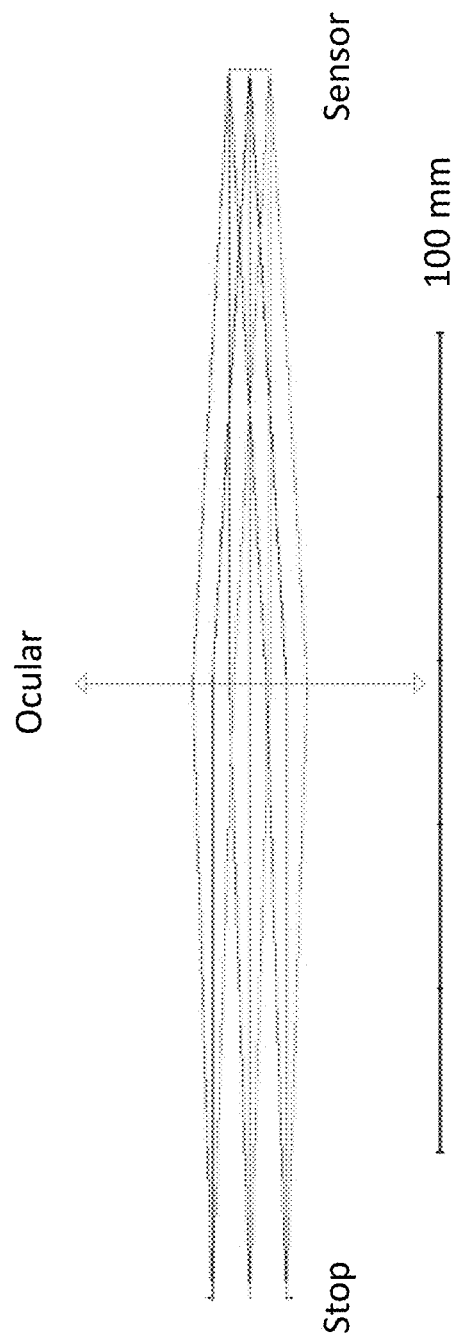

Focusing now on only the ocular part of the system, FIGS. 6 and 7 compare the ray bundles for a full object field and a smaller aperture stop (illustrated in FIG. 6) and a one-third object field size system (resulting in a 3× magnification for the digital representation rendered by the sensor) and a 3× larger aperture stop (illustrated in FIG. 7). Notably in the system of FIG. 6 the ray bundle requires a larger diameter of the ocular lens, but results in a relatively smaller beam footprint on the ocular lens, whereas in the system of FIG. 7, a smaller diameter is necessary, but the beam footprint is larger and substantially covers this smaller diameter. As a result, for this 3× zoom condition the ocular lens needs to be of higher quality only over a small area at the center of the ocular lens.

Figure 8:
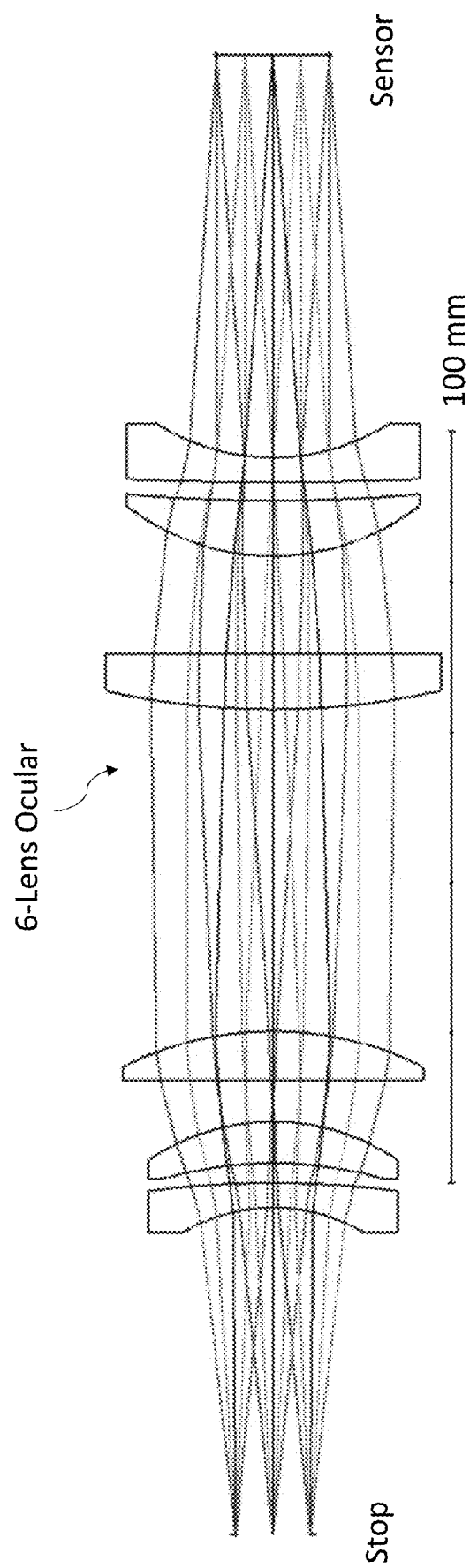
FIGS. 8-10 are ray trace diagrams for a 6-lens ocular using real lens elements.
Figure 9:
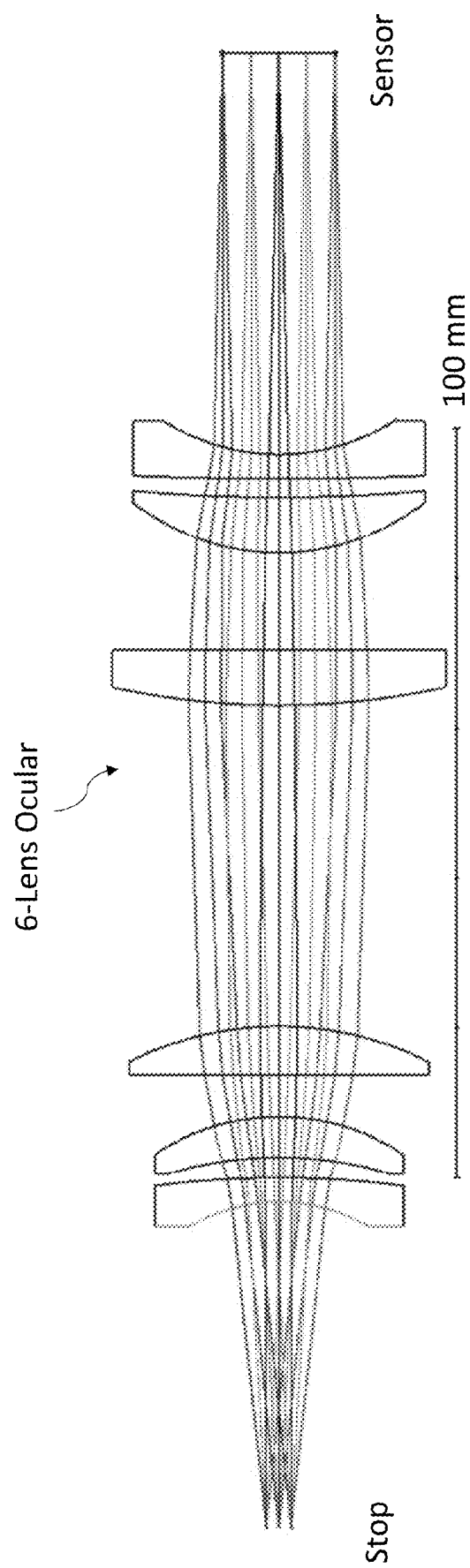
Figure 10:
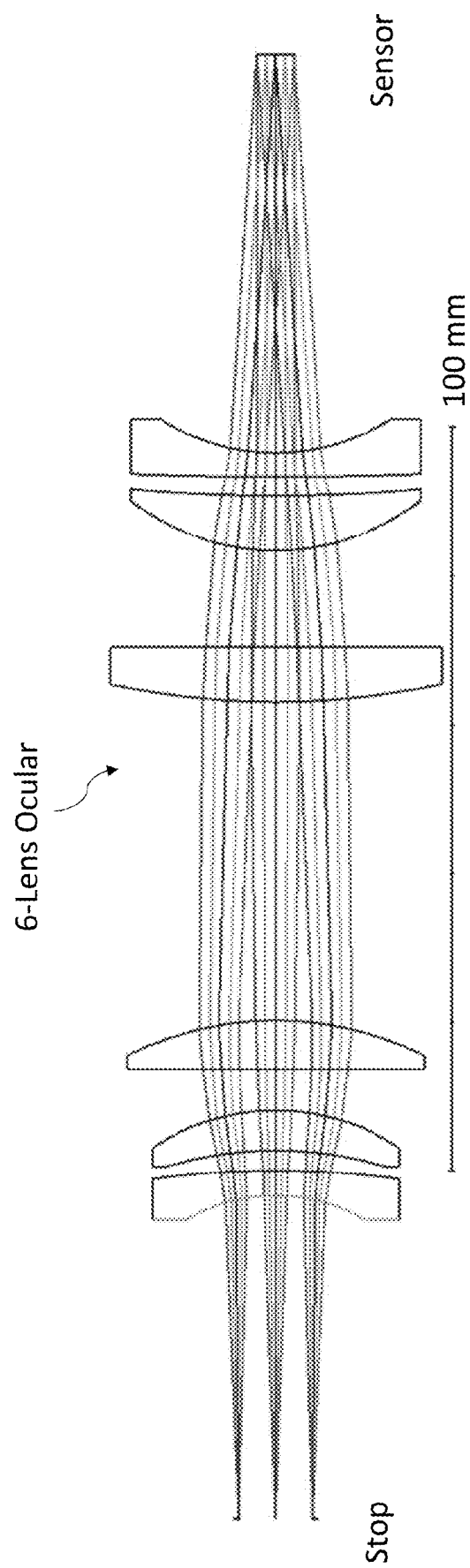

FIGS. 8-10 illustrate the same principles with a real ocular lens formed by multiple lens elements. Specifically, FIG. 8 shows a 6-element ocular designed to provide 3300-pixel resolution over the full field of view of the sensor. In contrast, FIG. 9 shows the same system, but with the stop size reduced to provide only 1100-pixel resolution, and resulting in a much smaller ray bundle footprint on the lens elements of the ocular. Finally, FIG. 10 illustrated the same system with same 3300-pixel resolution as in FIG. 6, but with one-third object field (resulting in a 3× magnification for the digital representation rendered by the sensor), which shows a similar (or even smaller) ray bundle footprint as that for FIG. 9.

Figure 11:
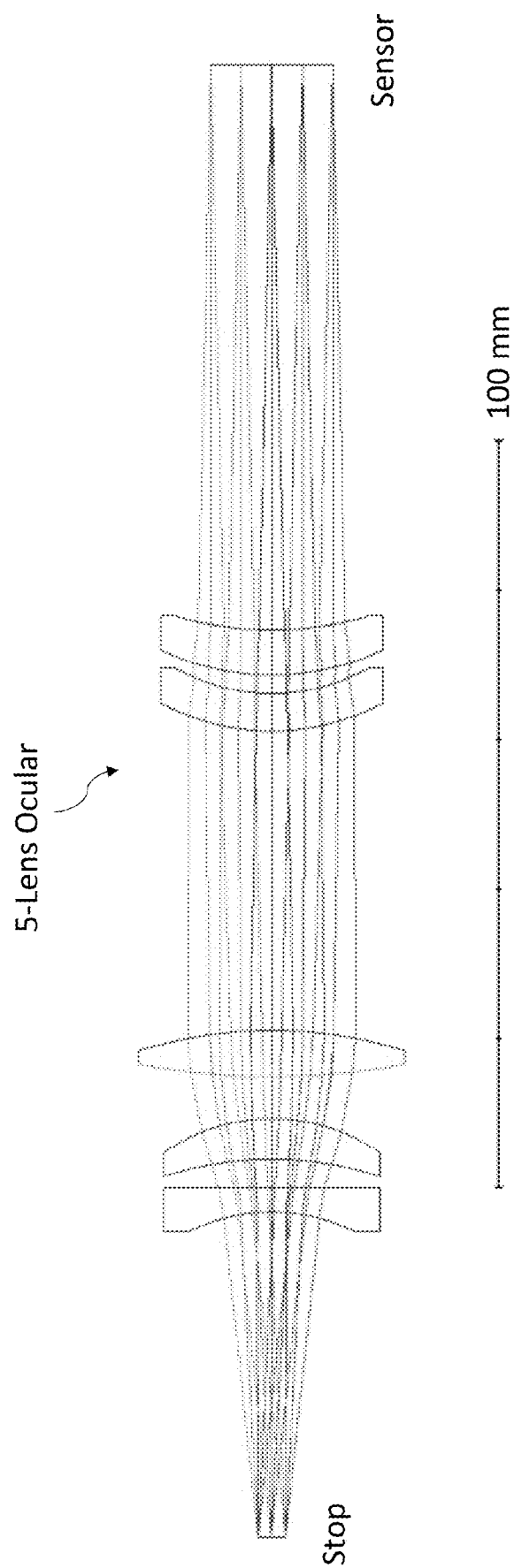
FIG. 11 is a ray trace diagram for a 5-lens ocular using real lens elements and implementing the optical design simplification of the present invention to enable diffraction-limited imaging for a variable-zoom system implementing digital zoom.

By reducing the diameter of the lenses required between FIGS. 8 and 9, the cost of the ocular is reduced. Further simplification and cost reduction is also possible because an ocular which meets these imaging specifications no longer requires 6 elements. For example, a new ocular is shown in FIG. 11, where the number of elements has been reduced from 6 to 5.

Figure 12:
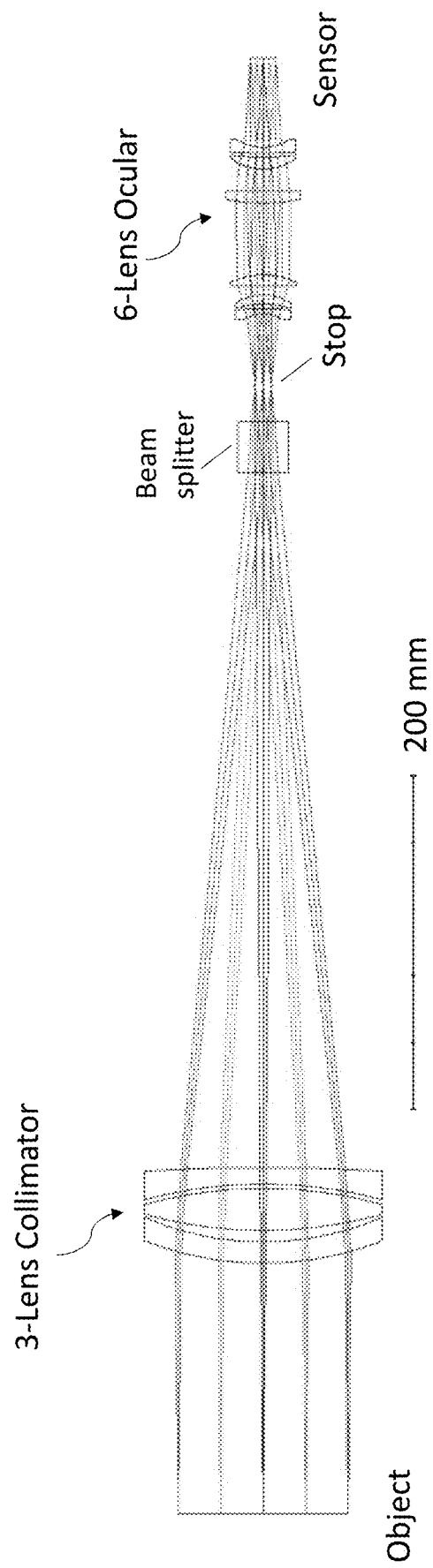
FIG. 12 is a ray trace diagram of the full optical system for the ocular shown in FIGS. 8-10 and includes a 3-lens collimator.
Figure 13:
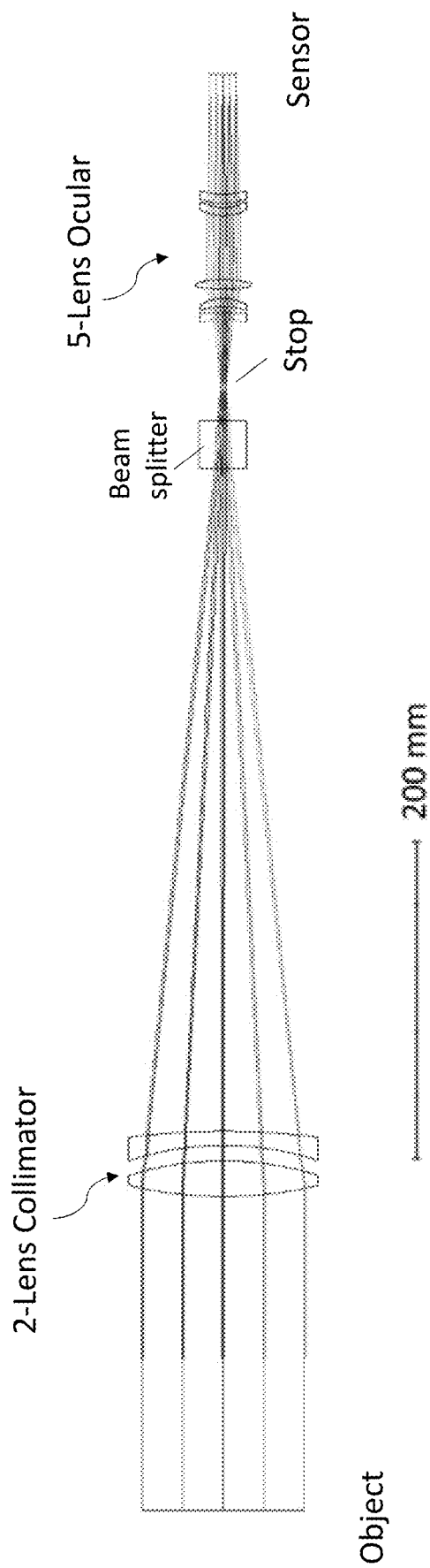
FIGS. 13 and 14 are ray trace diagrams of the full optical system for the ocular shown in FIG. 11 and that further includes a 2-lens collimator. The full optical system implements the optical design simplification of the present invention to enable diffraction-limited imaging for variable-zoom system implementing digital zoom.

Additionally, the large collimator used with the ocular in FIG. 8 requires 3 elements to achieve the imaging performance of 3300 pixels across the entire object field as shown in FIG. 12 providing the full system layout. On the other hand, the collimator for use with the ocular in FIG. 11 and shown in FIGS. 13 and 14 providing the full system layout only requires 2 elements, a further cost savings. FIG. 13 shows the inventive system imaging the full object field at 1100-pixel resolution, and FIG. 14 shows the system imaging the one-third object field (resulting in a 3× magnification for the digital representation rendered by the sensor) at 1100-pixel resolution, but with the pixel dimension one third of that for FIG. 13.

Figure 14:
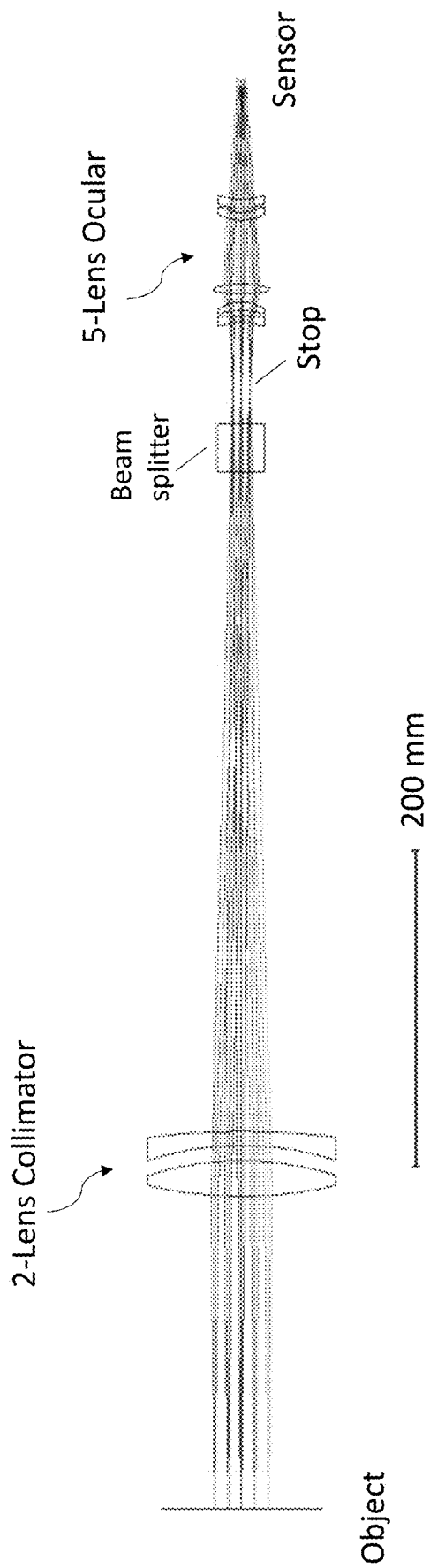
Figure 15:
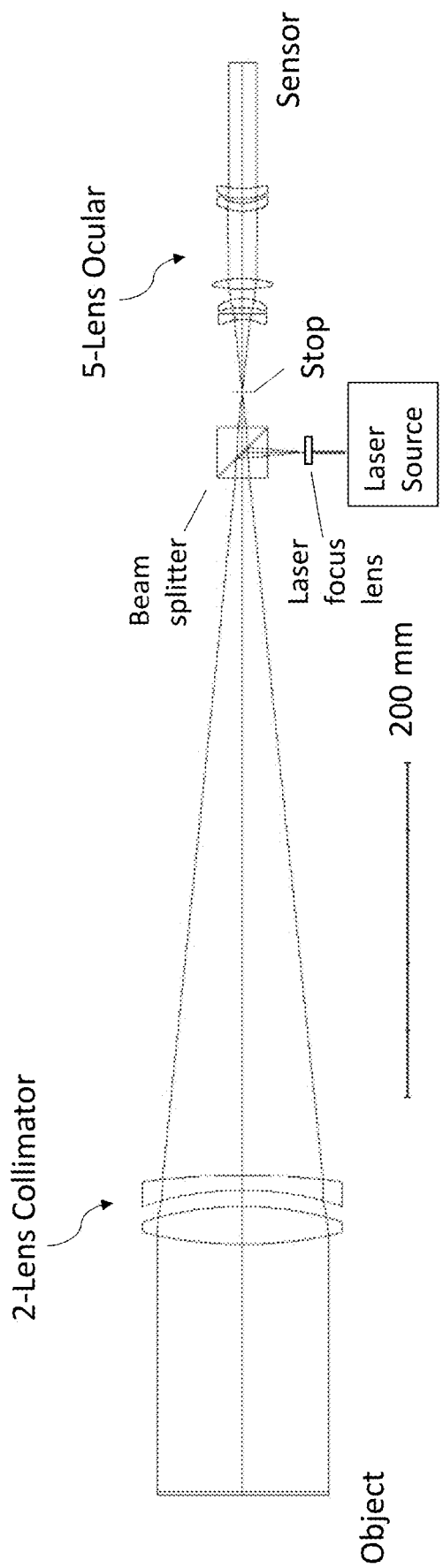
FIG. 15 is a schematic of the optical imaging system of FIGS. 13 and 14 further including a laser source as an illumination source to illuminate the object via a beam-splitter.

The full system layouts depicted in FIGS. 12-14 include a beam-splitter element (depicted as a rectangular element) along the optical path between the collimator and the aperture stop position. The purpose of the beam splitter to couple light from an illumination source (e.g., a laser source) to illuminate the object (e.g., a test part under inspection) to generate the light rays imaged by the collimator and ocular onto the sensor. The full system including these additional elements is shown in FIG. 15. Specifically, light from a laser source is focused by laser focus lens and then reflected by the beam splitter and passes through the 2-lens collimator to illuminate the object (e.g., a test part) in the object field. Light emerging from the test part in response to this illumination light is then imaged by the 2-lens collimator through the beam splitter and an aperture stop, which defines the image-side numerical aperture for the system and is located at the focus of the 2-lens collimator. Light passing through the aperture stop is then focused by the 5-lens ocular to form on optical image of the object on the sensor, which is used to capture a digital representation of the object.

In other embodiments, different illumination configurations can be used. For example, an illumination source can illuminate the object at an angle from the side, or from back, or ambient light can be used to illuminate the object. As noted above, the illumination can be coherent (such as from a laser source) or incoherent, resulting in different requirements on the numerical aperture NA necessary to resolve certain-sized features.

Figure 16:
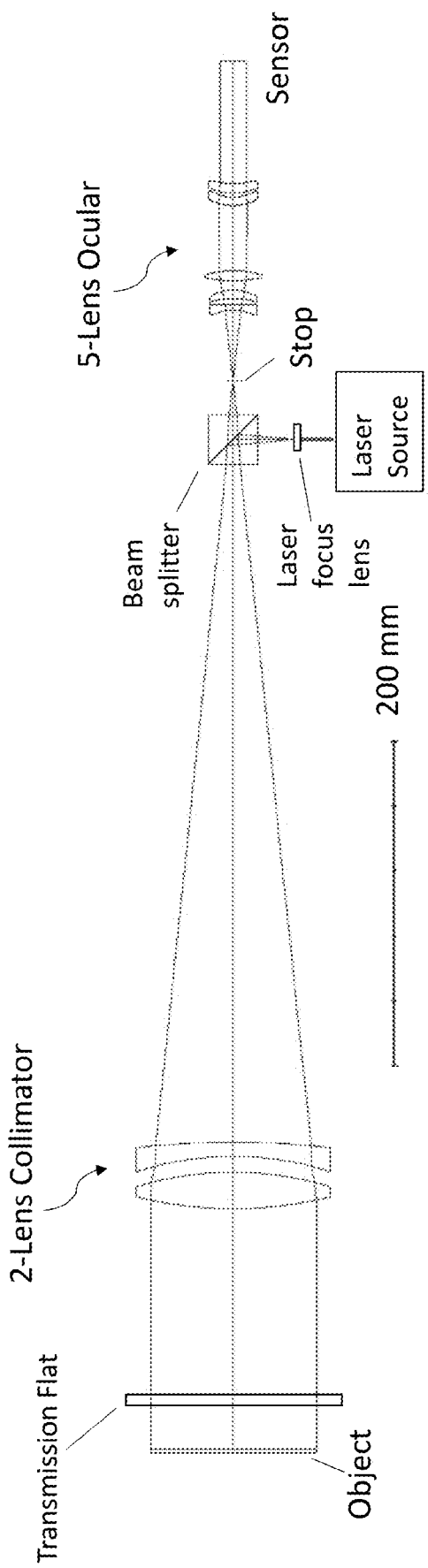
FIG. 16 is a schematic of the optical imaging system of FIG. 15 further implemented as an interferometric optical imaging system by including a reference element so that the image of the object formed on the sensor interferes with a reference wave-front to produce interferometric image of the object.

Furthermore, in other embodiments, the variable-zoom imaging system can be configured as an interferometric system, as illustrated schematically in FIG. 16, which further includes a reference element to the system of FIG. 15 to reflect illumination light back to the sensor through the 5-element ocular to interfere with the light from the test part and form an interferometric image of the test part on the sensor, which can be processed by the image processing circuitry to produce a digital representation of the interferometric image. For example, as is well-known in the art, interferometric imaging can be used to provide surface height information about a test part in the object area being imaged. Specifically, in FIG. 16, the reference element is a transmission flat position just prior to the object to reflect a small portion of the illumination light back to the sensor to interfere with the illumination light that reflects from the object.

Embodiments of the invention can have many different implementations. For example, the absolute magnification provided by the optical imaging system can be greater than one (i.e., magnifying) or less than one (i.e., de-magnifying). For example, in certain embodiments the minimum magnification will be between ¹⁄₁₀ and ⅕, such as would be suitable for the imaging optics in a Fizeau interferometer. In another example, in certain embodiments, the minimum magnification will be between ½ and 5, such as would be suitable for the imaging optics in a microscope interferometer. Also, for example, the area of the array of detector elements can vary over a wide range depending on the implementation, such as, anywhere between 0.25 $cm^2$ and 10 $cm^2$. Relatedly, an area of the object area imaged onto the array of detector elements can also vary over a wide range depending on the implementation, such as, anywhere between 0.04 $cm^2$ and 10,000 $cm^2$.

Also, in some embodiments, the adjustable aperture stop provides a continuously adjustable aperture opening, while in others, the adjustable aperture stop is discretely adjustable to each of a plurality of discrete settings. The adjustable aperture stop can be mechanically actuated or electronically actuated. Also, while the embodiment of FIGS. 1A and 2A have a user-control interface configured to adjust the adjustable aperture stop in response to a user-input for the zoom ratio, in other embodiments, the aperture stop can also be manually adjusted. Typically, the aperture opening is circular, but embodiments with square or rectangular openings are also possible.

Scope

It must be noted that as used herein and in the appended claims, the singular forms "a", "an", and "the" include plural referents unless the context clearly dictates otherwise, e.g., when the word "single" is used.

As used herein, the terms "adapted" and "configured" mean that the element, component or other subject matter is designed and/or intended to perform a given function. Thus, the use of the terms "adapted" and "configured" should not be construed to mean that a given element, component, or other subject matter is simply "capable of" performing a given function.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

What is claimed is:

1. A variable-zoom imaging apparatus comprising:
    imaging optics configured to form an image in an imaging area of an object positioned in an object area;
    an adjustable aperture stop to adjustably set a numerical aperture NA for the image formed by the imaging optics;
    an electronic detector comprising an array of detector elements positioned in the imaging area to detect the image; and
    image processing circuitry coupled to the electronic detector to produce a digital representation of the image based on signals from at least some of the detector elements,
    wherein the image processing circuitry produces the digital representation with a different magnification m of the object for each of a plurality of different numerical apertures for the image set by the adjustable aperture stop,
    wherein the different magnifications m vary from a minimum magnification $m_{min}$ to a maximum magnification $m_{max}$ to define a zoom ratio $z=m/m_{min}$ and a maximum zoom ratio $Z_{max}=m_{max}/m_{min}$, and
    wherein the imaging optics does not produce a diffraction-limited image over a full field area spanning all of the detector elements in the array when the adjustable aperture stop is set to a largest one of the plurality of different numerical apertures.

2. The variable-zoom imaging apparatus of claim 1, wherein the imaging optics are fixed to provide a constant magnification of the object area to the imaging area.

3. The variable-zoom imaging apparatus of claim 1, the zoom ratio z for the digital representation varies inversely with a field area spanned by the detector elements to produce the digital representation.

4. The variable-zoom imaging apparatus of claim 3, wherein the sizes of the plurality of different numerical apertures set by the adjustable aperture stop increase with corresponding increases in the zoom ratio z for the digital representation.

5. The variable-zoom imaging apparatus of claim 4, wherein the sizes of the plurality of different numerical apertures set by the adjustable aperture stop increases linearly with corresponding increases in the zoom ratio z for the digital representation over a range of zoom ratios greater than 1.

6. The variable-zoom imaging apparatus of claim 4, wherein the numerical "aperture NA for the image set by the adjustable aperture stop is given by $$NA \propto \frac{\lambda}{2p\left(\frac{z_{max}}{z}\right)},$$

where p is a maximum lateral dimension of a detector element and λ is a central wavelength in light used to form the image on the electronic detector.

7. The variable-zoom imaging apparatus of claim 4, wherein the digital representation comprises at least one intensity value at each pixel in an $N_1$ by $N_2$ array of pixels, where $N_1$ and $N_2$ are positive integers.

8. The variable-zoom imaging apparatus of claim 7, wherein $N_1$ and $N_2$ are each greater than or equal to 400.

9. The variable-zoom imaging apparatus of claim 7, wherein the array of detector elements for the electronic detector is as large as an $M \cdot N_1$ by $M \cdot N_2$, where M is a positive integer greater than or equal to $z_{max}$.

10. The variable-zoom imaging apparatus of claim 9, wherein $z_{max}$ is greater than or equal to 3.

11. The variable-zoom imaging apparatus of claim 9, wherein the image processing circuitry produces the digital representation with the zoom ratio z by determining the at least one intensity value for each pixel in the $N_1$ by $N_2$ array from one or more of the signals from the detector elements in a corresponding sub-array of M/z by M/z of detector elements.

12. The variable-zoom imaging apparatus of claim 11, wherein the image processing circuitry produces the digital representation with the zoom ratio z by determining the at least one intensity value for each pixel in the $N_1$ by $N_2$ array from only one of the signals from the detector elements in the corresponding sub-array of M/z by M/z of detector elements.

13. The variable-zoom imaging apparatus of claim 11, wherein the image processing circuitry produces the digital representation with the zoom ratio z by determining the at least one intensity value for each pixel in the $N_1$ by $N_2$ array from a weighted average of the signals from the detector elements in the corresponding sub-array of M/z by M/z of detector elements.

14. The variable-zoom imaging apparatus of claim 11, wherein the sub-arrays of detector elements corresponding to the pixels in the digital representation are repetitively spaced from one another within the field area spanned by the detector elements to produce the digital representation.

15. The variable-zoom imaging apparatus of claim 7, wherein the image processing circuitry produces the digital representation with the zoom ratio z by determining the at least one intensity value for each pixel in the $N_1$ by $N_2$ array from one or more of the signals from the detector elements in a corresponding sub-array of one or more detector elements, wherein the number of detector elements in each of corresponding sub-arrays decreases with the numerical aperture NA adjustably set by the adjustable aperture stop increases.

16. The variable-zoom imaging apparatus of claim 1, wherein the imaging optics comprise a first set of optics to direct the light from the object to a pupil defined by the adjustable aperture stop and a second set of optics to direct light from the pupil to image area.

17. The variable-zoom imaging apparatus of claim 1, further comprising a light source configured to illuminate the object and thereby provide light to the imaging optics for forming the image of the object.

18. The variable-zoom imaging apparatus of claim 16, further comprising interferometer components including a reference surface, and wherein a light source is also configured to illuminate the reference surface and the variable-zoom imaging apparatus is configured to coherently combine the light from the object and the reference surface so that the image formed by the imaging optics on the imaging area is an interferometric image.

19. The variable-zoom imaging apparatus of claim 17 wherein the light source is a coherent laser.

20. The variable-zoom imaging apparatus of claim 1, wherein the area of the array of detector elements is between 0.25 $cm^2$ and 10 $cm^2$.

21. The variable-zoom imaging apparatus of claim 1, wherein the minimum magnification is between 1/10 and 1/5.

22. The variable-zoom imaging apparatus of claim 1, wherein the minimum magnification is between 1/2 and 5.

23. The variable-zoom imaging apparatus of claim 1, wherein an area of the object area imaged onto the array of detector elements is between 0.04 $cm^2$ and 10,000 $cm^2$.

24. The variable-zoom imaging apparatus of claim 1, wherein the adjustable aperture stop is continuously adjustable.

25. The variable-zoom imaging apparatus of claim 1, wherein the adjustable aperture stop is discretely adjustable to each of a plurality of discrete settings.

26. The variable-zoom imaging apparatus of claim 1, wherein the adjustable aperture stop is a mechanical aperture stop.

27. The variable-zoom imaging apparatus of claim 1, wherein the adjustable aperture stop is an electronic aperture stop.

28. The variable-zoom imaging apparatus of claim 1, further comprising a user-control interface configured to electronically adjust the adjustable aperture stop in response to a user-input for the zoom ratio z.

29. The variable-zoom imaging apparatus of claim 28, wherein the user-control interface also causes the image processing circuitry to set the magnification of the object by the electronic detector in response to the user-input for the zoom ratio z.

30. The variable-zoom imaging apparatus of claim 29, wherein the image processing circuitry is configured to set the magnification of the object by the electronic detector by adjusting the sampling of the detector elements used to produce the digital representation.

31. The variable-zoom imaging apparatus of claim 1, where the adjustable aperture stop provides a nominally circular opening to define the numerical aperture NA.

32. The variable-zoom imaging apparatus of claim 1, where the adjustable aperture stop provides a nominally rectangular opening to define the numerical aperture NA.

33. The variable-zoom imaging apparatus of claim 4, wherein the imaging optics are not sufficiently large in diameter to pass all light ray trajectories from the object for a full field area of the object corresponding a full field area spanning all of the detector elements in the array when the adjustable aperture stop is set to a largest one of the plurality of different numerical apertures.

34. The variable-zoom imaging apparatus of claim 33, the imaging optics are sufficiently large in diameter to pass all light ray trajectories from the object for the full field area of the object when the adjustable aperture stop is set to a smallest one of the plurality of different numerical apertures.

35. The variable-zoom imaging apparatus of claim 1, wherein the imaging optics does produce a diffraction-limited image over the full field area when the adjustable aperture stop is set to the smallest one of the plurality of different numerical apertures.

36. The variable-zoom imaging apparatus of claim 35, wherein the imaging optics does produce a diffraction-limited image over a maximum-zoomed field area equal to an area of the full field area divided by $z_{max}$ when the adjustable aperture stop is set to the largest one of the plurality of different numerical apertures.

37. The variable-zoom imaging apparatus of claim 36, wherein the imaging optics producing a diffraction-limited image for the numerical aperture NA over a given field of view (FOV) in the image imaging area means that the imaging optics can produce a feature in the imaging area with a spatial period d as small as $$\frac{\lambda}{NA}$$

anywhere in the FOV for coherent illumination, wherein $\lambda$ is a central wavelength in light used to form the image on the electronic detector.

38. An optical imaging system for use with a variable-zoom imaging apparatus implementing a digital zoom, the optical imaging system comprising:
   a) imaging optics configured to form an image in an imaging area of an object positioned in an object area; and
   b) an adjustable aperture stop to adjustably set a numerical aperture NA for the image formed by the imaging optics,
   c) wherein the imaging optics are designed to form the image as a diffraction-limited image for each of a plurality of consecutive increasing numerical apertures NAs for the image set by the adjustable aperture stop corresponding to consecutively decreasing fields of view of the object in the object area, and
   wherein the imaging optics does not produce the image as the diffraction-limited image over a full field area spanning all of the imaging area when the adjustable aperture stop is set to a largest one of the plurality of different numerical apertures.

39. The optical imaging system of claim 38, wherein the imaging optics are not sufficiently large in diameter to pass all light ray trajectories from the object for a full field area of the object corresponding a full field area spanning all the imaging area when the adjustable aperture stop is set to a largest one of the plurality of different numerical apertures.

40. The optical imaging system of claim 39, wherein the imaging optics are sufficiently large in diameter to pass all light ray trajectories from the object for the full field area of the object when the adjustable aperture stop is set to a smallest one of the plurality of different numerical apertures.

41. The optical imaging system of claim 38, wherein producing the diffraction-limited image for the numerical aperture NA over a given field of view (FOV) in the image imaging area means that the imaging optics can produce a feature in the imaging area with a spatial period d as small as $$\frac{\lambda}{NA}$$

anywhere in the FOV for coherent illumination, wherein $\lambda$ is a central wavelength in light used to form the image on the electronic detector.

42. The optical imaging system of claim 38, wherein the imaging optics comprise a first set of optics between the object area and the adjustable aperture stop to direct light from the object to a pupil defined by the adjustable aperture stop and a second set of optics between the adjustable aperture stop and the imaging area to direct the light from the pupil to the imaging area.

43. A variable-zoom imaging apparatus comprising:
   imaging optics configured to form an image in an imaging area of an object positioned in an object area;
   an adjustable aperture stop to adjustably set a numerical aperture NA for the image formed by the imaging optics;
   an electronic detector comprising an array of detector elements positioned in the imaging area to detect the image; and
   image processing circuitry coupled to the electronic detector to produce a digital representation of the image based on signals from at least some of the detector elements,
   wherein the image processing circuitry produces the digital representation with a different magnification m of the object for each of a plurality of different numerical apertures for the image set by the adjustable aperture stop,
   wherein the different magnifications m vary from a minimum magnification $m_{min}$ to a maximum magnification $m_{max}$ to define a zoom ratio $z=m/m_{min}$ and a maximum zoom ratio $z_{max}=m_{max}/m_{min}$, and
   wherein the imaging optics are not sufficiently large in diameter to pass all light ray trajectories from the object for a full field area of the object corresponding a full field area spanning all of the detector elements in the array when the adjustable aperture stop is set to a largest one of the plurality of different numerical apertures.

* * * * *

UNITED STATES PATENT AND TRADEMARK OFFICE
CERTIFICATE OF CORRECTION

| | | |
|---|---|---|
| PATENT NO. | : 11,841,548 B2 | Page 1 of 1 |
| APPLICATION NO. | : 17/361760 | |
| DATED | : December 12, 2023 | |
| INVENTOR(S) | : Bruce E. Truax | |

It is certified that error appears in the above-identified patent and that said Letters Patent is hereby corrected as shown below:

In the Claims

Column 16
Line 44, in Claim 1, delete "$Z_{max}$" and insert -- $z_{max}$ --

Column 17
Line 2, in Claim 6, delete ""aperture" and insert -- aperture --
Line 11, in Claim 6, delete "2" and insert -- $\lambda$ --

Column 19
Line 17, in Claim 37, before "imaging" delete "image"

Column 20
Line 5, in Claim 41, after "the" delete "image"

Signed and Sealed this
Fifth Day of March, 2024

Katherine Kelly Vidal
*Director of the United States Patent and Trademark Office*